(12) United States Patent
Frigge

(10) Patent No.: US 10,822,530 B2
(45) Date of Patent: Nov. 3, 2020

(54) SILICONE-CONTAINING PRESSURE-SENSITIVE ADHESIVE AND PRESSURE-SENSITIVE ADHESIVE PRODUCTS SUCH AS AN ADHESIVE TAPE OR A LABEL, AND PROCESS FOR PRODUCING SAME

(71) Applicant: Coroplast Fritz Müller GmbH & Co. KG, Wuppertal (DE)

(72) Inventor: Christoph Frigge, Sprockhövel (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 0 days.

(21) Appl. No.: 16/080,191

(22) PCT Filed: Feb. 23, 2017

(86) PCT No.: PCT/EP2017/054237
§ 371 (c)(1),
(2) Date: Aug. 27, 2018

(87) PCT Pub. No.: WO2017/157639
PCT Pub. Date: Sep. 21, 2017

(65) Prior Publication Data
US 2019/0055437 A1    Feb. 21, 2019

(30) Foreign Application Priority Data
Mar. 17, 2016    (EP) .................................... 16160948

(51) Int. Cl.
| C09J 133/08 | (2006.01) |
| C09J 183/14 | (2006.01) |
| C08L 83/06 | (2006.01) |
| C09J 7/38 | (2018.01) |
| C09J 133/04 | (2006.01) |
| C09J 155/00 | (2006.01) |
| C09J 183/04 | (2006.01) |
| C09J 7/24 | (2018.01) |
| C09J 7/25 | (2018.01) |
| C09J 7/21 | (2018.01) |
| C09J 107/00 | (2006.01) |

(52) U.S. Cl.
CPC ............ *C09J 133/08* (2013.01); *C08L 83/06* (2013.01); *C09J 7/21* (2018.01); *C09J 7/241* (2018.01); *C09J 7/255* (2018.01); *C09J 7/38* (2018.01); *C09J 107/00* (2013.01); *C09J 133/04* (2013.01); *C09J 155/005* (2013.01); *C09J 183/04* (2013.01); *C09J 2203/334* (2013.01); *C09J 2301/408* (2020.08); *C09J 2421/00* (2013.01); *C09J 2433/00* (2013.01); *C09J 2483/00* (2013.01)

(58) Field of Classification Search
CPC combination set(s) only.
See application file for complete search history.

(56) References Cited

U.S. PATENT DOCUMENTS

| 4,996,088 | A | * | 2/1991 | Knittel | ..................... | C08K 5/57 |
| | | | | | | 428/40.9 |
| 5,308,887 | A | | 5/1994 | Ko et al. | | |
| 5,464,659 | A | | 11/1995 | Melancon et al. | | |
| 5,624,763 | A | | 4/1997 | Melancon et al. | | |
| 7,605,203 | B2 | * | 10/2009 | Feng | ....................... | C08L 75/04 |
| | | | | | | 524/268 |
| 8,614,278 | B2 | | 12/2013 | Loubert et al. | | |
| 2012/0095159 | A1 | * | 4/2012 | Liu | ......................... | C09J 133/00 |
| | | | | | | 524/588 |
| 2012/0330212 | A1 | * | 12/2012 | Persyn | .................... | A61L 15/58 |
| | | | | | | 602/54 |

FOREIGN PATENT DOCUMENTS

| DE | 101 56 672 A1 | | 5/2003 |
| EP | 2 692 811 A1 | | 2/2014 |
| JP | S 62-295982 A | | 12/1987 |
| JP | 2008-038105 | * | 2/2008 |
| WO | WO 99/26572 A1 | | 6/1999 |

OTHER PUBLICATIONS

Machine translation of JP 2008-038105 (no date).*
International Search Report from corresponding PCT application No. PCT/EP2017/054237 dated Apr. 5, 2017 (3 pgs).
(Continued)

*Primary Examiner* — Marc S Zimmer
(74) *Attorney, Agent, or Firm* — Dickinson Wright PLLC

(57) ABSTRACT

An adhesive containing silicone, in the form of an adhesive compound which contains at least a first adhesive component and a second adhesive component containing silicone is provided. The second, silicon-laced adhesive component consists of a non-crosslinked polysiloxane. The kinematic viscosity of the non-crosslinked polysiloxane is at least 100,000 mm$^2$/s and at most 10,000,000 mm$^2$/s or that the molar mass of the non-crosslinked polysiloxane is less than 10,000 g/mol, and the second, silicone-containing adhesive component is microencapsulated. Alternatively it can be provided that the molar mass of the polysiloxane is at least 80,000 g/mol and at most 500,000 g/mol, or that the kinematic viscosity of the non-crosslinked polysiloxane is less than 100,000 mm$^2$/s, and the second, silicone-containing adhesive component is microencapsulated.

14 Claims, No Drawings

(56) References Cited

OTHER PUBLICATIONS

Sieghard Millow: "kinematische Viskosität—", Römpp online version 4.0,. Nov. 1, 2005, p. 1-1, XP055296855, Retrieved from the Internet: URL:HTTPS://ROEMPP.THIEME.DE/ROEMPP4.0/DO/DATA/rd-11-01081 [retrieved on Aug. 22, 2016] cited in the application whole document.
International Preliminary Report on Patentability from corresponding PCT application No. PCT/EP2017/054237 dated Sep. 18, 2018 (8 pgs).

* cited by examiner

SILICONE-CONTAINING PRESSURE-SENSITIVE ADHESIVE AND PRESSURE-SENSITIVE ADHESIVE PRODUCTS SUCH AS AN ADHESIVE TAPE OR A LABEL, AND PROCESS FOR PRODUCING SAME

CROSS-REFERENCE TO RELATED APPLICATIONS

This application is a 35 U.S.C. § 371 national phase application of International Application No.: PCT/EP2017/054237, filed Feb. 23, 2017, which claims the benefit of priority under 35 U.S.C. § 119 to European Patent Application No.: EP 16160948.2, filed Mar. 17, 2016, the contents of which are incorporated herein by reference in their entirety.

FIELD OF THE INVENTION

The present invention pertains to an adhesive containing silicone, in the form of an adhesive compound which contains at least a first adhesive component and a second adhesive component containing silicone, whereby the second, silicon-laced adhesive component consists of a non-crosslinked polysiloxane.

Furthermore, the invention pertains to pressure-sensitive adhesive products, such as sticky tape, comprising a band-shaped carrier upon at least one side of which a pressure-sensitive adhesive in the form of an adhesive compound is applied, or label stickers, comprising a carrier material, particularly paper-based, upon at least one side of which a pressure-sensitive adhesive in the form of an adhesive compound is applied.

Finally, the invention pertains to a process for the production of such pressure-sensitive adhesive products.

In the context of the application, the general term of "pressure-sensitive adhesive product" includes—along with sticky tape, which is cut to length in band-shaped portions, i.e. the length is a multiple of the width—corresponding stamped products and particularly label stickers, in which the length and width are in the same order of magnitude.

BACKGROUND

Pressure-sensitive adhesives commonly used today are made predominantly of natural or synthetic rubber, or of polyacrylates. Rubber adhesives consist of polyisoprene or block copolymers of styrene and isoprene or butadiene and must be blended with resins in order to obtain pressure-sensitive adhesive properties. In most cases, mineral oil as a plasticizer and/or inorganic filler materials or pigments such as chalk, zinc oxide, or titanium dioxide are added as well. Acrylate pressure-sensitive adhesives usually consist of a copolymer of various esters of acrylic acid. 2-ethylhexyl acrylate and n-butyl acrylate are particularly common.

Additionally there are special solvent-based pressure-sensitive adhesives based on crosslinked polydimethylsiloxanes, known as silicone pressure-sensitive adhesives. These consist of linear polydimethylsiloxane and/or silanol-terminated polydimethyldiphenylsiloxane as a base polymer and a tackifying resin, which in turn consists of a quaternary silicate core with surrounding trimethylsiloxane groups and dimethylsilanol groups. Removing the solvent and heating results in a condensation reaction between the resin and the base polymer, which produces a pressure-sensitive adhesive mass. To improve the properties, particularly cohesion, the condensate is also crosslinked, which is achieved either by a peroxide-catalyzed radical mechanism or a platinum-catalyzed addition mechanism. The properties of the adhesive depend on the chain length of the reactants, the mixing ratio, and the degree of crosslinking.

A pressure-sensitive adhesive similar to the type initially described is known from JPS 62-295982 A. This document describes the combination of an acrylate pressure-sensitive adhesive with a silicone pressure-sensitive adhesive to achieve special adhesive properties. The adhesive is used in a fastening system for the automotive industry and is a hybrid adhesive, in which the first adhesive component and the second, silicone-containing adhesive component are crosslinked with each other by a polyurethane or a polyisocyanate.

An adhesive composition and a film for an optical component is known from EP 2 692 811 A1. This composition contains an acrylate and alkyl-containing copolymer component (A), a copolymer component (B), which is composed at least 60% by mass of a monomeric constituent containing polyoxyalkylene groups, and furthermore contains an alkali metal salt as a third component (C), and finally a dimethylpolysiloxane compound as component (D), which is also a copolymer insofar as this compound contains polyoxyalkylene groups as further polymeric constituents terminally bonded to a dimethylpolysiloxane base chain—or preferably as a laterally graft copolymer. This fourth component (D) is intended to improve the anti-static properties. It will also be described in detail that the ratio of the two copolymer constituents can be used to establish a specific ratio of lipophilic and hydrophilic components in the macromolecule, which is expressed in the so-called HLB value (hydrophilic-lipophilic balance). This value should be no greater than 9.

Furthermore, patents U.S. Pat. Nos. 5,308,887, 5,464,659, 5,624,763, and 8,614,278 also describe pressure-sensitive adhesives which are similar to the type initially described. The first three documents describe predominantly solvent-free combinations of acrylate and silicone pressure-sensitive adhesives. These pressure-sensitive adhesives demonstrate favorable adhesion properties especially on non-polar surfaces. For its production, the solvent-based silicone pressure-sensitive adhesive is first dried, then dissolved in acrylate monomers. After addition of a crosslinking agent and a photo-initiator, polymerization and cross-linking are effected under UV radiation, wherein generally two separate, interpenetrating polymer networks of a polysiloxane and a polyacrylate are formed, particularly in the end product. In contrast, according to the final document to be cited, siloxane and acrylate are chemically selectively crosslinked to form a copolymer network.

WO 99/26572 A1 describes an anti-wrinkle composition containing vitamins which is affixed to human skin by means of a self-adhesive strip. Although the scope of application is far removed from the goal of the present invention of improving cutting properties—to be subsequently described in detail—the document still mentions a generic pressure-sensitive adhesive with the addition of various polysiloxane compositions, including non-crosslinked polydimethylsiloxane or a generic adhesive article, insofar as the anti-wrinkle composition containing adhesive is found on a carrier which is generally referred to as "impermeable film backing". In the known anti-wrinkle product, the silicone serves to reduce adhesion to the skin, whereby approximately eight hours, i.e. overnight application—is regarded as the upper limit of adhesion time. Therefore it is desirable that the polysiloxane migrates to the active adhesive surface, which can only be achieved with low molecular weight silicone oils. Accordingly, the anti-wrinkle composition with vitamins makes use of silicones with viscosities of 20-25,000 cStokes (=mm$^2$/s). Preferably, and thus also used in the examples, are silicones with viscosities of 20-12,500 cStokes (=mm$^2$/s).

In the adhesive tape or label industries, pressure-sensitive adhesives are applied to carrier materials in thin layers, that is with a specific mass in the area of 15 g/m$^2$ to 3000 g/m$^2$ in order to produce corresponding adhesive tape or labels. In the finished product, but also immediately after coating and during processing, in particular aggressively adhesive layers are usually covered with a release paper or film. This consists of a paper or plastic foil, which itself is usually coated on one or both sides with a thin layer of a crosslinked polydimethylsiloxane. The grammage of such a layer can lie particularly in an area between 0.5 g/m$^2$ and 1.5 g/m$^2$.

Generally, various cutting and stamping techniques are used in the processing of adhesive tapes or labels, by means of which the base product, produced particularly in a width between 100 mm and 2500 mm receives the appropriate dimensions for further processing or for final usage. It is thereby inevitable that the cutting edges of the cutting tools used come into direct contact with the pressure-sensitive adhesive. Depending on the properties of the material to be cut, such as the thickness of the adhesive, the ratio of adhesive thickness to carrier thickness, the stickiness and the viscoelastic properties of the adhesive, which can cause a so-called cold flow, but also depending on the ambient conditions such as temperature and humidity, the cutting tools will eventually become contaminated after a greater or lesser number of cutting operations. This is especially the case when not one but several layers are cut in one cutting operation, or when a very high number of cutting operations are performed without intermediate cleaning. In the case of adhesive tapes, for example, rolls are parted off by means of circular knives or styli from typical wide rolls with up to several hundred layers. In the adhesive label industry, it is common to cut self-adhesive sheets in stacks of several hundred sheets using a guillotine cutter. Specifically, a thousand layers is to be regarded as an upper limit.

A known method to counteract the contamination of the cutters is to use special blade geometry with a relief edge as well as using knives with non-stick coatings, or to use cutting aids such as talc or cutting oil on the cutting tools.

All of these measures always have some drawbacks, however. Fluid cutting aids are hardly usable in the processing of self-adhesive papers, as they can leach into the paper and thus contaminate and weaken it. Such aids are also not desirable when working with other materials to be cut, as they not only contaminate the carrier material, but in the case of overdosing, such as at the beginning of the cutting process, it can sometimes reduce the stickiness of the pressure-sensitive adhesive to an uncontrolled degree. Single-use cutting aids or even non-stick coatings on cutting tools, for example ceramic or Teflon, are often depleted quickly, so that their effect diminishes rapidly.

The contamination of cutting tools can, for example, lead to cases in which during the cutting of stacks of sheets or during high-speed processing operations the cut parts remain adhered to the cutting tools by the slightly tacky cut edges after the cutting process, and thus destroy the entire process.

The invention is based on the problem to create a silicone-containing pressure-sensitive adhesive as described at the outset which, when it is applied single or double sided to a carrier material, a release paper, or a release foil, demonstrates improved cutting characteristics in comparison to conventional pressure-sensitive adhesives, without experiencing a significant loss of adhesive power and/or shear strength.

Furthermore, the invention must address the problem of providing a pressure-sensitive adhesive product such as tape or labels with a pressure-sensitive adhesive of the type initially described which offers greater product workability during the production of the tape and/or labels, particularly for the cutting operations which are required in the manufacturing process, without a decrease in quality of the manufactured products, wherein the previously described disadvantages are avoided.

SUMMARY AND INTRODUCTORY DESCRIPTION OF THE INVENTION

This problem is solved for the pressure-sensitive adhesives of the type initially described in that the kinematic viscosity of the non-crosslinked polysiloxane is at least 100,000 mm$^2$/s and at most 10,000,000 mm$^2$/s or that the molar mass of the non-crosslinked polysiloxane is less than 10,000 g/mol, wherein the second, silicone-containing adhesive component is microencapsulated.

Alternatively, it can be provided in accordance with the invention that the molar mass of the non-crosslinked polysiloxane is at least 80,000 g/mol, preferably at least 100,000 g/mol, and at most 500,000 g/mol, or that the kinematic viscosity of the non-crosslinked polysiloxane is less than 100,000 mm$^2$/s, wherein the second, silicone-containing adhesive component, is microencapsulated.

This can advantageously be a non-crosslinked polydimethylsiloxane, wherein the polysiloxane, preferably the non-crosslinked polydimethylsiloxane, is preferably present in the adhesive composition in an amount from 1.0 to 10.0 percent by mass.

For pressure-sensitive adhesive products, particularly the tape and labels as initially described, the problem facing the invention is solved in that the adhesive composition comprises at least a first adhesive component and a second, silicone-containing adhesive component, present in the adhesive composition as previously described.

The carrier or carrier material can consist of a paper, a film, or a textile material, such as a woven and/or non-woven material, and preferably has a thickness in the range from 10 µm to 500 µm, especially in the range from 20 µm to 200 µm.

In accordance with the invented process, the pressure-sensitive adhesive product according to the invention receives its final dimensions via cutting or stamping, originating from a base product of greater width, particularly with a width in the range of 100 mm to 2500 mm, wherein the cutting tools used come into direct contact with the pressure-sensitive adhesive on the cut corners. It is hereby advantageously unnecessary to use special cutter geometry, such as relief angles, or cutters with non-stick coatings and/or to apply cutting aids to the cutting tools.

Polysiloxanes consist of a chain which alternately contains silicon and oxygen atoms. Organic radicals thereby saturate the free valencies of the silicon. The polysiloxane with the simplest structure and by far the largest—although not according to the invention—distribution is polydimethylsiloxane, in which the organic radicals are methyl groups. Polydimethylsiloxanes are widely used in the form of silicone oils. In contrast to mineral oils or vegetable oils, they have no organic, i.e. no carbon-based, chain fractions. Copolymers, particularly as they are contained in the adhesive composition known from EP 2 692 811 A1, for example dimethylpolysiloxane base chains that are combined with other polymeric constituents such as polyoxyalkylene groups, are not subsumed under the term "non-crosslinked polysiloxane".

The chemical formula for polydimethylsiloxane is $(CH_3)_3Si-[O-Si(CH_3)_2]_m-O-Si(CH_3)_3$, wherein the degree of polymerization is n=m+2 and for the index m: m≥0. The molar mass of the repeat unit is 74.15 g/mol. Polydimethylsiloxane is colorless, transparent, and is considered non-toxic and chemically inert. It is subsumed under "inert" that the polydimethylsiloxane remains passive under UV radiation, and particularly that it does not chemically interact with the first adhesive component. Therefore it can easily be detected as a component of an adhesive composition.

The simplest silicone oil which is marketed commercially by Wacker AG under the name "AK 0.65" consists of a Si—O—Si unit in which the free valencies are covered by methyl groups. The degree of polymerization n therefore equals 2. This low molecular weight compound, a dimer whose molecular mass is 162 g/mol, is considered in the scope of the application to be a usable "polydimethylsiloxane" in accordance with the invention, but only in the case of microencapsulation. The kinematic viscosity is only 0.65 mm$^2$/s. Instead, however, a silicone oil marketed by Wacker AG under the name "AK 30,000", which has a kinematic viscosity of 30,000 mm$^2$/s and a molar mass of 80,000 g/mol can be used according to the invention without microencapsulation.

The data on kinematic viscosity v (Greek letter "ny") in manufacturer data sheets, particularly for example for "AK 500,000" from Wacker AG, are often based on a provision in accordance with the DIN 53019-1:2008-09 standard regarding the measurement method for viscosity: "Viscosimetry—Measurement of Viscosities and Flow Curves with Rotational Viscometers—Part 1: Fundamentals and Measurement Geometry". This standard is also used as the authoritative method of determination for this application.

Measurement is carried out accordingly with a rotational viscometer, determining the rotational speed and torque at 25° C. To measure the viscosity, a measuring body is immersed in the substance to be measured and rotated at a predetermined speed n in a cylindrical container. The force acting in the torque, which is required to keep the rotational speed n constant, is a measurement for the dynamic viscosity η.

As is known, the kinematic viscosity v is then obtained by dividing the dynamic viscosity η by the density ρ (see also Sieghard Millow: "Kinematische Viskosität", Römpp online version 4.0, 1 Nov. 2005, pages 1-1, [Found on the internet: 22 Aug. 2016], URL: https://roempp.thieme.de/roempp4.0/do/data/RD-11-01081). The density p in the silicones used in accordance with the invention lies in a range between 0.94 g/cm$^3$ and 0.97 g/cm$^3$ at 25° C. For devices currently in use, viscosity is calculated automatically, with acknowledgment of the specific characteristics of the measuring system being used, whereby the influence of the measuring system geometry is accounted for and eliminated by corresponding factors. It is thereby achieved that the measured values differ only marginally from those obtained by other methods, such as flow cups, capillary rheometers, or any kind of falling ball viscometers, which usually also perform corresponding geometry compensations, for example with consideration to the flow cup diameter. Particularly in the case of highly viscous substances, preferably with a viscosity v over 80,000 mm$^2$/s, potential deviations arising from the measurement method fall within the order of relative errors of the measuring system, and are therefore considered negligible.

In cases of older measurement data (until the end of 1977, for example, dynamic viscosity could be measured in centipoise or, as shown above, the kinematic viscosity could be expressed in centistokes) or in cases of measurement data obtained with equipment other than DIN 53019-1: 2008-09 (for example Saybolt seconds determined with the Saybolt viscometer according to ASTM D-88-56), it is possible to convert to units commonly used in the contemporary international unit system with the help of tables or nomograms, so that directly comparable values can be derived. Polysiloxanes in particular represent substances which can be measured without problems due to their comparatively low temperature-viscosity dependence and due to their properties as so-called "Newtonian fluids", that is, an independence of viscosity from applied shear strength.

The fact that the pressure-sensitive adhesive according to the invention contains a non-reactive linear polydimethylsiloxane, particularly one of a high molecular mass, results in a significantly lower contamination of the cutters with the relatively short contact time between the cutter and the pressure-sensitive adhesive-coated products to be cut in comparison to pressure-sensitive adhesive products not in accordance with the invention, and does not result in the cut pieces adhering to each other or to the cutter, so that disruptions to the cutting process are markedly reduced or even eliminated completely.

Among other things, the fact that the polysiloxanes used in accordance with the invention exhibit a low surface tension at 25° C. in the range of 18.0 mN/m to 21.7 mN/m, particularly in the range of 20.8 mN/m to 21.6 mN/m, measured according to DIN 53 914:1997-07, is exploited. For example, the aforementioned "AK 60,000" from Wacker AG displays a surface tension of 21.5 mN/m at 25° C.

"High molecular mass" is understood to mean that the molar mass of the polydimethylsiloxane is at least 10,000 g/mol, preferably at least 50,000 g/mol, or alternatively that it has reached at least the claimed value of 80,000 g/mol, preferably 100,000 g/mol. A molar mass of 500,000 g/mol can be considered an upper limit for the polydimethylsiloxane used in accordance with the invention.

The molecular masses (synonyms: molecular weight, molar mass) as stated in the application are, as is typical with polymers, average molar masses. A distinction is made here between $M_n$ (numerical average), $M_w$ (weight average), and $M_z$ (centrifuge average). In this case it is always true that $M_n < M_w < M_z$. Ultimately, this distinction is only based on different statistical methods to describe the distribution of the molar mass. These values are only equal in the theoretical case that all molecules actually have the same molar mass and there is no distribution. The information contained in the brochures of various manufacturers is usually the numerical average $M_n$, which is by far the most common method of characterizing a mean value such as this. The so-called polydispersity D, which is a measure of the width of the molar mass distribution, can be calculated as the quotient of $M_w/M_n$. The type and width of molar mass distribution do not seem to be significant for the purposes of the invention, as they are technically limited in the production process always to similar forms.

Molar mass can also be calculated using the correlation between kinematic viscosity and molar mass of polysiloxanes, discovered by A. J. Barry (J. Appl. Physics, 117, 1020, 1946) using the formula $$M_n = [(\log v - 1)/0.0123]^2$$

from measurements of viscosity v, whereby v is the numerical value of kinematic viscosity at 25° C. (expressed in mm$^2$/s) and M$_n$ is the numerical average of the molar mass, which must, however, be greater than 2500 g/mol for the formula to be applicable.

The use of high molecular weight silicones has been found to be fundamentally advantageous. Although the cut-facilitating effects of low molecular weight silicones are no worse, they do have a much greater tendency to migrate, which can result in problems in other areas. Thus, for example, the bond strength of the pressure-sensitive adhesive according to the invention could be reduced too much.

The polydimethylsiloxane advantageously acts as an internal lubricant, which briefly passivates the cutting edge and the cutting tool during the cutting process. Using a proportion of polydimethylsiloxane in a range between 1.0 and 10.0 percent by mass in the adhesive composition, a preferred range according to the invention, it is assured that the bond strength and shear strength are not significantly diminished in comparison to known adhesive compositions, but rather are preserved.

Additional advantageous forms of the invention are to be found in the following description.

DETAILED DESCRIPTION OF THE INVENTION

In the design forms of the invention listed below, various pressure-sensitive adhesive formulations which are preferred in accordance with the invention are presented, which specifically differ in the nature of the first component of the pressure-sensitive adhesive composition. These formulations are each compared with alternate formulations which contain no polydimethylsiloxane.

Table 1 details examples of formulations with a synthetic rubber adhesive.

The silicone oil named in this table—AK 500,000 from Wacker—is a polydimethylsiloxane with a kinematic viscosity of 500,000 mm$^2$/s.

TABLE 1

Formulation examples 1a (comparison example) and 1b (according to invention)

| | | Manufacturer | 1a | 1b |
|---|---|---|---|---|
| Synthetic rubber | Vecor 4114 | Dexco | 32% | 30% |
| Terpene phenolic resin | Dertophene T | DRT | 18% | 17% |
| Rosin | Granolite P | DRT | 18% | 17% |
| Soft resin | Wingtack 10 | Cray Valley | 26.5% | 25% |
| PE Wax | A-C8 | Honeywell | 5% | 5% |
| Anti-oxidant | Irganox 1010 | BASF | 0.5% | 0.5% |
| Silicone oil | AK 500,000 | Wacker | — | 5% |

In general the kinematic viscosity of the polydimethylsiloxane used in accordance with the invention should be at least 50,000 mm$^2$/s, preferably at least 100,000 mm$^2$/s. A value of 10 million mm$^2$/s can be considered an upper limit.

The soft resin listed in the table is a tackifying synthetic C5 resin with a softening point of less than 20° C.

"Anti-oxidant" in table 1 refers to the admixture of substances which counteract the thermo-oxidative degradation of a polymer, here a hot-melt adhesive. Sterically hindered phenols, in this case specifically the aforementioned Irganox 1010, are preferred as radical scavengers.

Both example substances were applied as hot-melt adhesives to 80 g/m$^2$ paper and covered with a layer of 100 g/m$^2$ paper which was coated in silicone on one side.

Table 2 details examples with an acrylate dispersion adhesive, with consideration of the various solid states, i.e. without water content.

An acrylate dispersion, as it is listed in table 2, is understood to mean an aqueous dispersion of a polyacrylic acid ester produced by emulsion polymerization.

TABLE 2

Formulation examples 2a (comparison example) and 2b (according to invention)

| | | Manufacturer | 2a | 2b |
|---|---|---|---|---|
| Acrylate dispersion | Acronal V215 (solid content 69%) | BASF | 46% | 43.5% |
| Acrylate dispersion | Acronal 80D (solid content 50%) | BASF | 20% | 19% |
| Resin dispersion | Dermulsene RE802 (solid content 52%) | DRT | 33.5% | 32% |
| DOSS* | OT75 | Airproducts | 0.5% | 0.5% |
| Silicone oil dispersion | HV 495 (solid content 40%) | Dow Corning | — | 5% |

*Dioctyl sulfosuccinate

The silicone oil dispersion listed in table 2 is an aqueous dispersion of a polydimethylsiloxane. This is not produced by emulsion polymerization, but rather by a subsequent emulsification of a polydimethylsiloxane. "Solid content" in the second column refers to the respective solid content in the dispersion. Silicone oil dispersion is a milky white fluid which can exhibit a kinematic viscosity in a range between 78,000 mm$^2$/s and 200,000 mm$^2$/s, whereby the molar mass of the silicone oil reaches at least 100,000 g/mol.

Both example substances were applied at a grammage of 18 g/m$^2$ to a paper with a specific basis weight of 90 g/m$^2$ siliconized on one side, where it was dried and then transferred to a paper with a specific basis weight of 80/m$^2$.

Table 3 details examples of formulations with a UV acrylate adhesive.

TABLE 3

Formulation examples 3a (comparison example) and 3b (according to invention)

| | | Manufacturer | 3a | 3b |
|---|---|---|---|---|
| Polyacrylate | AcResin 3502 | BASF | 100% | 97% |
| Silicone oil | AK 500,000 | Wacker Chemistry | — | 3% |

The silicone oil named in this table—AK 500,000 from Wacker—is a polydimethylsiloxane with a kinematic viscosity of 500,000 mm$^2$/s.

Both example substances were applied at a grammage of 30 g/m$^2$ to a PET film with a thickness of 50 μm which was siliconized on one side, where they were crosslinked via a UV-C dose of 65 mJ/cm$^2$ and then transferred to a non-siliconized 50 μm-thick PET foil. The UV-C dose was measured with the "Power Puck" dosimeter from EIT Company of Sterling, Va.

The samples were used to determine the typical pressure-sensitive adhesive base data representative of adhesion and cohesion, in the form of bond strength and shear strength.

Additionally, the cuttability of the self-adhesive material was determined in a laboratory test. To this end, two DIN-A4 sheets of the adhesive material were placed atop one another and 5 mm wide strips were cut with commercially available guillotine shears with smooth, clean steel blades. The blade had a width in a range of 50 to 60 mm. The contamination of the blade was checked after multiple cuts.

The examples demonstrated the properties listed in table 4.

TABLE 4

Comparison of properties of the examples

| | Example 1a | Example 1b | Example 2a | Example 2b | Example 3a | Example 3b |
|---|---|---|---|---|---|---|
| Bond strength (on steel) [N/cm] DIN EN 1939 | >8* | >8* | 7 | 7 | 6.5 | 6 |
| Shear strength 625 mm²; 23° C. [min] | >10000 | >10000 | >10000 | >10000 | >10000 | >10000 |
| Cutting test with 5 cuts | Blade very sticky to 45 mm, strips cling to blade | Blade sticky to 1 mm, strips do not cling to blade | Blade very sticky to 45 mm, strips cling to blade | Blade sticky to 1 mm, strips do not cling to blade | Blade very sticky to 45 mm, strips cling to blade | Blade sticky to 1 mm, strips do not cling to blade |
| Cutting test with 50 cuts | — | Blade sticky to 3 mm, strips do not cling to blade | — | Blade sticky to 2 mm, strips do not cling to blade | — | Blade sticky to 3 mm, strips do not cling to blade |

*Paper tear

DIN EN 1939 "Adhesive Tapes: Determining Bond Strength" as mentioned in table 4 is the version DIN EN 1939:2003-12. The bond strength on steel can lie specifically between 5 N/cm and 10 N/cm, preferably in a range between 6 N/cm and 8 N/cm, measured according to DIN EN 1939:2003-12.

In general according to the invention it can be reached that the bond strength to steel is reduced only by 10 percent maximum, measured according to DIN EN 1939:2003-12 and compared to a pressure-sensitive adhesive product which does not contain the second, silicone-containing adhesive component, but for which the remaining components of the adhesive composition are in the same ratio to one another.

Shear strength was determined according to DIN EN 1943:2003-01 "Adhesive Tapes—Measuring Shear Resistance under Static Load"; German edition EN 1943:2002.

The results clearly demonstrate that the invention results in greater workability during cutting processes while excluding negative effects on bond strength and shear strength.

The following additional practical tests were carried out with the samples:

A stack with dimensions 70 cm×100 cm with 200 sheets of adhesive material were cut into small squares with dimensions of 5 cm×5 cm using a guillotine shear with smooth blades. With the materials from the examples according to the invention 1 b, 2b, and 3b, this was possible with no problems, but with the materials from the comparison examples 1a, 2a, and 3a, the sheets adhered after the third cut and clung to the blade, so that cleanly cutting and depositing the square stack was no longer possible.

The invention is not limited to the design examples illustrated here, but rather includes in the scope of its claims all equivalent designs and applications in the context of the invention. Thus it is conceivable that, in contrast to the polydimethylsiloxane described in the example, a polysiloxane is used in which other substituents in addition to and/or instead of methyl groups, such as acryl radicals with more than one carbon atom, phenyl radicals and/or halogens, are bonded to the main chain.

Concerning the aforementioned influence of the molar mass of the polydimethylsiloxane, its migration capacity decreases with an increasing degree of polymerization n, and increases with a decreasing degree of polymerization n. If, for instance, in example 1b an AK 50 with less than 100 dimethylsiloxane units in the polymer chain is used instead of AK 500,000, which consists of significantly more than 1000 dimethylsiloxane units in the polymer chain, the disadvantage is observed that after warm storage of only 24 hours at 70° C., there is visible silicone migration into the paper carrier.

However, the use of low molecular weight silicone oils appears to be advantageous if they are microencapsulated, especially with a molar mass of the polysiloxane of less than 10,000 g/mol, as provided according to the invention. Generally, due to the still sufficient fluidity, microencapsulation can alternately be provided according to the invention in all cases in which the kinematic viscosity of the non-cross-linked polysiloxane is less than 100,000 mm²/s.

Microencapsulation is generally understood to mean the coating of very fine drops of a mostly fluid active substance with a thin-walled inert material. Concerning the invention, such encapsulation prevents unwanted migration of low molecular weight silicone oil. At the moment of cutting, the shell of the microcapsules is damaged by the cutting tool. The silicone oil which constitutes the fluid core is thereby released and locally in a very restricted area performs its function as a release agent. The particle size of the microcapsules can lie in a range between 3 μm and 800 μm, preferably in a range between 5 μm and 100 μm. Materials considered inert are those which do not chemically react to most substances under ideal conditions, such as pressure and temperature. For example, ceramic, fluoroplastics such as PTFE, and the precious metals gold and platinum are considered inert, as well as gelatin-encapsulated medications.

Microencapsulation of silicone oil is known in and of itself, and described for example in patent DE 101 56 672 A1. The example productions of particles described therein are microcapsules with an average particle size of 3 μm and 5 μm, which have a liquid phase of silicone oil enclosed within capsule walls made of polyurea-containing material.

Although there is no indication in DE 101 56 672 A1 of using microcapsules in general and microencapsulated silicone oil specifically in adhesives, specifically pressure-sensitive adhesives, and preferably adhesive articles made with pressure-sensitive adhesives, it has been found that the material of the capsule walls as described is compatible with the pressure-sensitive adhesives preferred as materials for the first adhesive component used in the context of the invention, on the basis of rubber, of dispersion adhesives on the basis of polyacrylic acid esters, of hot-melt adhesives on the basis of UV crosslinked polyacrylic acid esters, or of UV polymerized polyacrylic acid esters, and that the adhesive properties are not negatively affected, at least when the second, silicone-containing adhesive component is present in a proportion of 1.0 to 10.0 percent by mass.

Microencapsulation is only sensible, however, when it is ensured that the microcapsules will be broken open during use—during cutting in the context of the invention—and thereby the silicone is released as an active agent. For example, in a simple bonding of adhesive tape, as is provided for in WO 99/26572 A1, which contained a microencapsulated substance in its adhesive layer, the necessary opening of the capsules and thus the desired effect attributed to the encapsulated substance could not be achieved.

While the above description constitutes the preferred embodiment of the present invention, it will be appreciated that the invention is susceptible to modification, variation and change without departing from the proper scope and fair meaning of the accompanying claims.

The invention claimed is:

1. An adhesive comprising a first adhesive component and a second, silicone-containing adhesive component, wherein the second, silicone-containing adhesive component consists of a non-crosslinked polysiloxane that is or without microencapsulation,
   wherein the second, silicone-containing adhesive component has a molar mass of at least 100,000 g/mol and at most 500,000 g/mol;
   whereby the molar mass is calculated using the formula:

$$M_n=[(\log v-1)/0.01231]^2,$$

wherein v is the numerical value of a kinematic viscosity in mm$^2$/s at 25° C. from measurements of the viscosity in accordance with DIN 53019-1:2008-09, and $M_n$ is the numerical average of the molar mass,
   whereby the bond strength of the adhesive on steel lies in a range between 5 N/cm and 10 N/cm measured according to DIN EN 1939:2003-12.

2. The adhesive according to claim 1, wherein the second, silicone-containing adhesive component is present in the adhesive in a ratio of 1.0 to 10.0 percent by mass.

3. The adhesive according to claim 1, wherein the surface tension of the non-crosslinked polysiloxane at 25° C. is in a range between 18.0 mN/m and 21.7 mN/m, measured according to DIN 53 914:1997-07.

4. The adhesive according to claim 1, wherein the first adhesive component is a pressure-sensitive adhesive, the pressure-sensitive adhesive is at least one of the following:
   based on a synthetic or natural rubber,
   a dispersion adhesive based on a polyacrylic acid ester,
   a hot-melt adhesive based on a UV-crosslinking polyacrylic acid ester, or
   a UV-polymerizing polyacrylic acid ester.

5. A pressure-sensitive adhesive product comprising a band-shaped carrier upon which at least on one side a pressure-sensitive adhesive in the form of an adhesive composition is applied,
   wherein the adhesive composition exhibits the features of claim 1.

6. A pressure-sensitive adhesive product, comprising a carrier material upon which at least on one side a pressure-sensitive adhesive in the form of an adhesive composition is applied,
   wherein the adhesive composition exhibits the features of claim 1.

7. The pressure-sensitive adhesive product according to claim 6, wherein the carrier material consists of a paper, a film, or a textile material.

8. The pressure-sensitive adhesive product according to claim 7, wherein the film or textile material consists of a polyolefin, a polyester, a polyamide, a polystyrene, or another synthetic material.

9. The pressure-sensitive adhesive product according to claim 5, wherein the carrier exhibits a thickness in a range from 10 μm to 500 μm.

10. The pressure-sensitive adhesive product according to claim 5, wherein the bond strength on steel is in a range between 5 N/cm and 10 N/cm, measured according to DIN EN 1939:2003-12.

11. The pressure-sensitive adhesive product according to claim 10, wherein the bond strength to steel, measured according to DIN EN 1939:2003-12, can be reduced by a maximum of 10 percent compared to a similar pressure-sensitive adhesive product which does not contain the second, silicone-containing adhesive component.

12. The pressure-sensitive adhesive product according to claim 5, wherein the adhesive composition is covered with an additional liner, the additional liner consisting of a paper or foil which is siliconized on one or both sides.

13. A process for manufacturing a pressure sensitive adhesive product comprising a band-shaped carrier upon which at least on one side a pressure-sensitive adhesive in the form of an adhesive composition is applied, the process comprising:
   providing a base product having a width in a range from 100 mm to 2500 mm, and
   cutting or stamping the base product with a cutting tool, wherein the cutting tool comes into direct contact on cutting edges with the pressure-sensitive adhesive,
   wherein the adhesive composition comprises a first adhesive component and a second, silicone-containing adhesive component, the second, silicone-containing adhesive component consisting of a non-crosslinked polysiloxane, without microencapsulation;
   wherein the second, silicone-containing adhesive component has a molar mass of at least 100,000 g/mol and at most 500,000 g/mol;
   whereby the molar mass is calculated using the formula:

$$M_n=[(\log v-1)/0.01231]^2,$$

wherein v is the numerical value of a kinematic viscosity in mm$^2$/s at 25° C. from measurements of the viscosity in accordance with DIN 53019-1:2008-09, and $M_n$ is the numerical average of the molar mass,
   whereby the bond strength of the adhesive on steel lies in a range between 5 N/cm and 10 N/cm measured according to DIN EN 1939:2003-12.

14. The process according to claim 13, wherein the pressure-sensitive adhesive product is an adhesive tape which is parted off from a roll with up to a thousand layers on top of one another via circular blades or styli, or that the pressure-sensitive adhesive product is a label which is cut or stamped from a stack of up to a thousand sheets on top of one another via a guillotine shear.

\* \* \* \* \*